United States Patent
Kyung et al.

(10) Patent No.: US 8,253,686 B2
(45) Date of Patent: Aug. 28, 2012

(54) POINTING APPARATUS CAPABLE OF PROVIDING HAPTIC FEEDBACK, AND HAPTIC INTERACTION SYSTEM AND METHOD USING THE SAME

(75) Inventors: Ki Uk Kyung, Daejeon (KR); Jun Young Lee, Daejeon (KR); Jun Seok Park, Daejeon (KR); Chang Seok Bae, Daejeon (KR); Dong Won Han, Daejeon (KR); Jin Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 852 days.

(21) Appl. No.: 12/275,732

(22) Filed: Nov. 21, 2008

(65) Prior Publication Data

US 2009/0135164 A1    May 28, 2009

(30) Foreign Application Priority Data

Nov. 26, 2007  (KR) .................. 10-2007-0120838
Feb. 20, 2008  (KR) .................. 10-2008-0015283
Jul. 18, 2008   (KR) .................. 10-2008-0070009

(51) Int. Cl.
*G06F 3/033* (2006.01)
(52) U.S. Cl. ......... 345/158; 345/173; 345/174; 345/179
(58) Field of Classification Search .................. 345/156, 345/173, 179, 158, 163
See application file for complete search history.

(56) References Cited

U.S. PATENT DOCUMENTS

| | | | | |
|---|---|---|---|---|
| 6,188,388 | B1* | 2/2001 | Arita et al. | 345/158 |
| 2002/0054030 | A1 | 5/2002 | Murphy | |
| 2006/0119586 | A1* | 6/2006 | Grant et al. | 345/173 |
| 2007/0236449 | A1* | 10/2007 | Lacroix et al. | 345/156 |
| 2008/0088602 | A1* | 4/2008 | Hotelling | 345/173 |
| 2008/0143693 | A1* | 6/2008 | Schena | 345/179 |
| 2009/0184923 | A1* | 7/2009 | Schena | 345/156 |
| 2009/0244032 | A1* | 10/2009 | Westerman et al. | 345/174 |
| 2010/0265179 | A1* | 10/2010 | Ram | 345/163 |

FOREIGN PATENT DOCUMENTS

| | | |
|---|---|---|
| KR | 2000-0052317 A | 8/2000 |
| KR | 2005-0018882 A | 2/2005 |
| KR | 2006-0017512 A | 2/2006 |
| WO | 2004/102366 A2 | 11/2004 |
| WO | 2006/080601 A1 | 8/2006 |

* cited by examiner

*Primary Examiner* — Thuy Pardo
(74) *Attorney, Agent, or Firm* — Ladas & Parry LLP

(57) ABSTRACT

Provided are a pointing apparatus capable of providing haptic feedback, and a haptic interaction system and method using the same. The pointing apparatus includes a wireless communication unit, a controller, and a haptic stimulator. The wireless communication unit receives an event including haptic output information through wireless communication with the outside. The controller generates a control signal for reproducing a haptic pattern corresponding to the haptic output information. The haptic stimulator reproduces the haptic pattern by means of the control signal. Thus, it is possible to increase the performance and usability of a user interface of a user terminal including a touch screen.

27 Claims, 19 Drawing Sheets

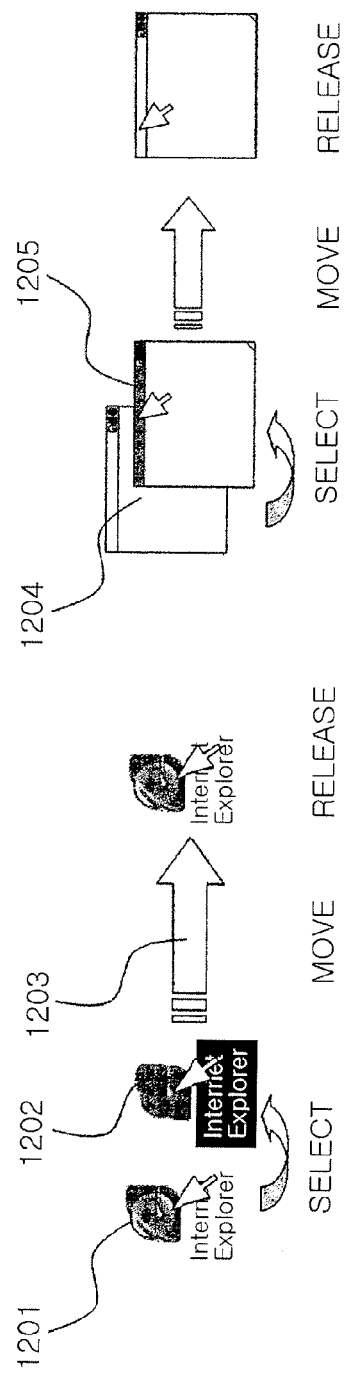
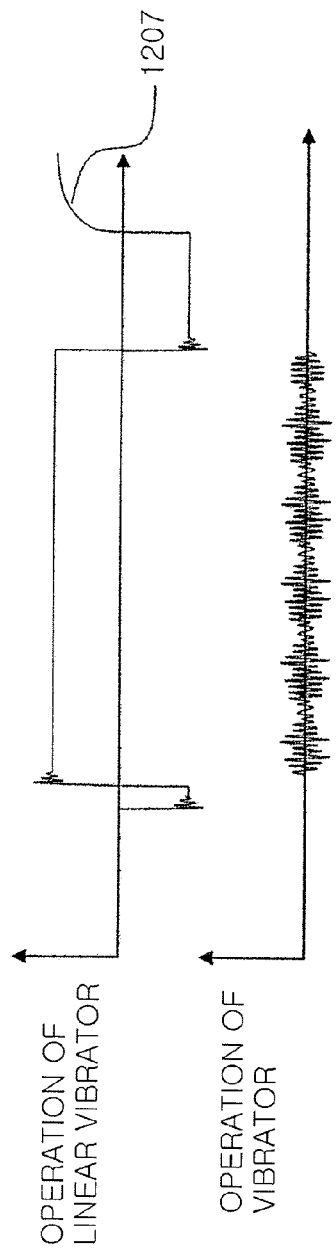
FIG. 12A
FIG. 12B

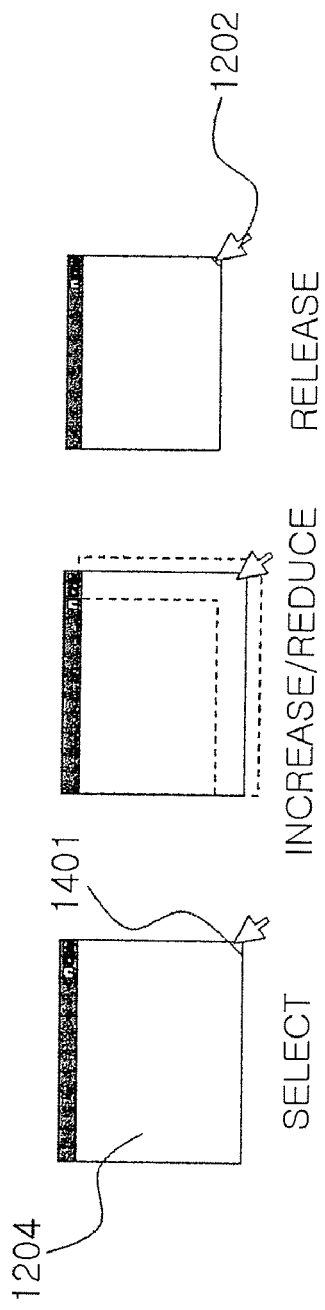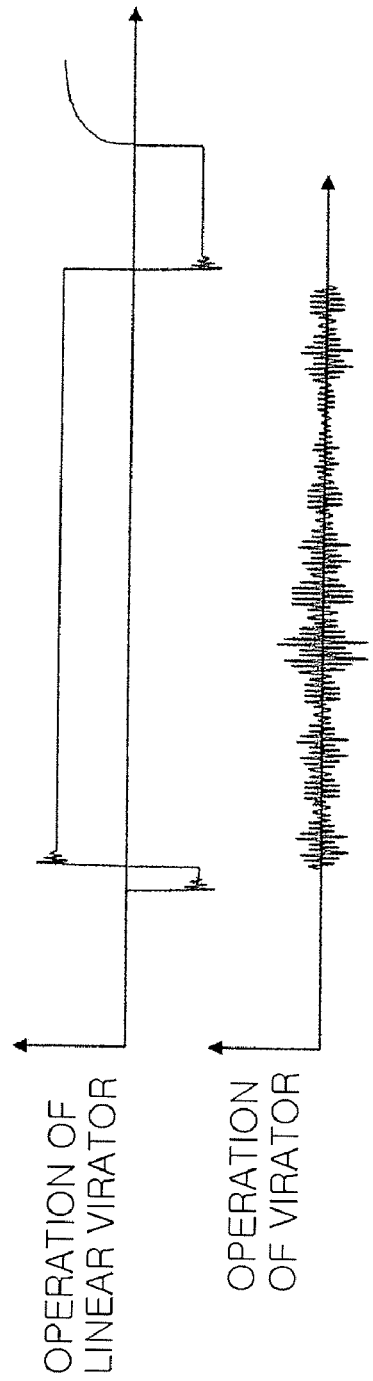

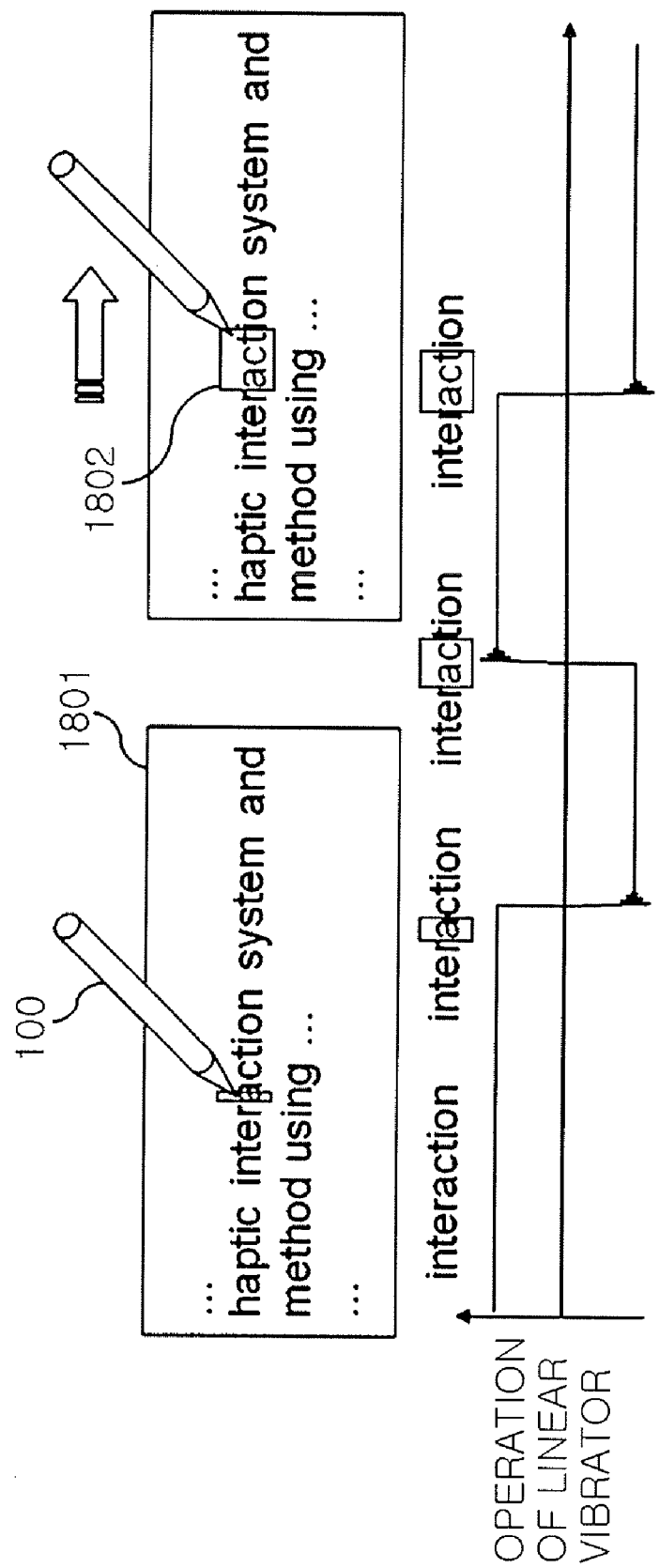

POINTING APPARATUS CAPABLE OF PROVIDING HAPTIC FEEDBACK, AND HAPTIC INTERACTION SYSTEM AND METHOD USING THE SAME

CROSS-REFERENCE TO RELATED APPLICATIONS

This application claims the priorities of Korean Patent Application No. 2007-120838 filed on Nov. 26, 2007, Korean patent Application No. 2008-15283 filed on Feb. 20, 2008, and Korean Patent Application No. 2008-70009 filed on Jul. 18, 2008 in the Korean Intellectual Property Office, the disclosures of which are incorporated herein by reference.

BACKGROUND OF THE INVENTION

1. Field of the Invention

The present invention relates to an apparatus for increasing the performance and usability of user interfaces of various devices by means of a haptic feedback, and more particularly, to a pointing apparatus capable of providing haptic feedback, which can increase the usability by giving a haptic feedback function to a user interface of a touch screen that has only an image and cannot provide the feeling of object, and a haptic interaction system and method using the same.

This work was supported by the IT R&D program of MIC/IITA [2006-S-032-02, Development of an Intelligent Service Technology based on the Personal Life Log].

2. Description of the Related Art

In general, the position and function of a pointer in a touch screen can be controlled by directly contacting the touch screen from the outside of the touch screen. A stylus is used to conveniently perform a contact with the touch screen.

The stylus may be implemented in a pen-type pointing device. The stylus may control a pointer of the touch screen by directly contacting the touch screen, or by approaching the surface of the touch screen by means of an electrical induction parts included in the stylus.

In a related art, a stylus having a built-in position sensor at its end is used to sense a position change while rubbing the surface of the touch screen, and a suitable haptic reaction corresponding to the sensed movement is output through a drive unit installed in the stylus.

In another related art, a stylus includes a pressure sensor at its tip, an acceleration sensor at its inside, and a linear vibrator at its opposite end, to output a suitable haptic reaction corresponding to the movement of the stylus.

These related arts have a limitation in that position and pressure sensors must be attached to a stylus.

Research has been conducted to reproduce a haptic reaction by directly installing a haptic feedback device in a touch screen. However, this technology must intervene in a manufacturing process of a touch screen.

SUMMARY OF THE INVENTION

An aspect of the present invention provides a pointing apparatus capable of providing haptic feedback, which can be used in a touch screen including a sensor that can sense the position of a stylus when the stylus contacts therewith or approaches thereto.

An aspect of the present invention also provides a pointing apparatus capable of providing haptic feedback, which includes an internal power supply unit and a wireless communication unit so that it can be used as an independent system, and a linear vibrator is disposed at which handle so that a feeling of pressing a button can be sensed even when a mass for generating a vibration is not large.

An aspect of the present invention also provides a pointing apparatus capable of providing haptic feedback, which can use a variety of haptic or auditory output devices (sound input/output devices) simultaneously.

According to an aspect of the present invention, there is provided a pointing apparatus capable of providing haptic feedback, the pointing apparatus including: a wireless communication unit receiving an event including haptic output information through wireless communication with the outside; a controller generating a control signal for reproducing a haptic pattern corresponding to the haptic output information; and a haptic stimulator reproducing the haptic pattern by means of the control signal.

The pointing apparatus may further include: a battery serving as a power supply unit; and a charge terminal charging the battery.

The pointing apparatus may further include a sound output unit reproducing a sound effect corresponding to the haptic pattern.

The pointing apparatus may further include a microphone and a speaker providing a sound input/output function for a voice call or a voice command.

The controller may control the sound output unit to output an alarm or alarm sound.

The event may be generated in response to an operation of the pointing apparatus on a touch screen.

The haptic stimulator may include at least one of: a rotary vibrator generating a vibration by means of a first mass that is rotated by the control signal; and a linear vibrator generating an impact and a vibration by means of a second mass that linearly moves upward and downward by a magnetic field corresponding to the control signal.

The first mass may be eccentrically attached to a rotation axis of the rotary vibrator to generate the vibration through eccentric rotation motion.

When a target on a touch screen is selected or released, the controller may generate one of an impact of the second mass on the top side, a sequential impact of the second mass on the top side and the bottom side, and a sequential impact of the second mass on the bottom side and the top side.

When a target on a touch screen is selected or released, the controller may control the haptic stimulator by means of the control signal to generate a vibration of the first mass or the second mass in order to reproduce the corresponding haptic pattern.

The controller may increase the input cycle of the control signal in proportion to the moving speed of a pointer.

The controller may increase the vibration intensity of the rotary vibrator in proportion to the moving speed of a pointer.

When a pointer moves by the unit of a movement distance, the controller may generate a short vibration of the rotary vibrator or a sequential impact of the linear vibrator on the bottom side and the top side.

The controller may gradually increase the intensity of a vibration while the size of a window is maximized.

The controller may control the haptic stimulator by means of the control signal so that the intensity of a vibration is gradually reduced while the size of a window is minimized.

The controller may control the haptic stimulator by means of the control signal so that the intensity of a vibration is increased in proportion to the deviation distance of a pointer from a predetermined region.

When a window on a touch screen is closed, the controller may control the haptic stimulator according to the control signal in order to reproduce the corresponding haptic pattern by means of one of a gradually weakening vibration, a short vibration, and a sequential impact of the linear vibrator on the bottom side and the top side for a predetermined time.

When a new pop-up menu is generated on a touch screen, the controller may control the haptic stimulator according to the control signal in order to reproduce the corresponding haptic pattern by means of one of a short vibration and a sequential impact of the linear vibrator on the bottom side and the top side for a predetermined time.

When the number of objects selected by the pointing apparatus is varied on a touch screen, the controller may generate a sequential impact of the second mass on the top side and the bottom side. At this point, the objects selected by the pointing apparatus on the touch screen may be selected from the group consisting of a character in a document, an icon, a folder and a file which is selectable one or more.

When the pointing apparatus is disposed on a button having a predetermined purpose, the controller may generate a repetitive impact of the second mass on the top side or the bottom side. At this point, the controller may collide the second mass against only one of the top side and the bottom side, and gradually move the second mass so that it cannot collide with the opposite side when it moves to the opposite side.

When the size or angle of a figure are varied on a touch screen as much as a reference unit value by the pointing apparatus, the controller may generate a sequential impact of the second mass on the top side and the bottom side.

According to another aspect of the present invention, there is provided a haptic interaction system using a pointing apparatus capable of providing haptic feedback, the haptic interaction system including: a pointing apparatus for controlling a pointer of a touch screen by contacting the touch screen or approaching the surface of the touch screen from the outside of the touch screen, receiving an event including haptic output information corresponding to the control of the pointer through wireless communication, and reproducing a haptic pattern corresponding to the haptic output information; and a user terminal for generating in an application program the event including the haptic output information corresponding to the control of the pointer in the touch screen, and transmitting the generated event to the pointing apparatus.

The pointing apparatus may include: a wireless communication unit receiving an event including the haptic output information through wireless communication with the outside; a controller generating a control signal for reproducing a haptic pattern corresponding to the haptic output information; and a haptic stimulator reproducing the haptic pattern by means of the control signal. The haptic simulator may include at least one of: a linear vibrator generating a motion of a mass in a vertical direction with respect to the contact surface of the touch screen; and a rotary vibrator including a rotatable eccentric mass. The pointing apparatus may be pen-type.

According to still another aspect of the present invention, there is provided a haptic interaction method during the press of a button on a touch screen in a haptic interaction system using a pointing apparatus capable of providing haptic feedback, the haptic interaction method including: when a button on the touch screen is pressed by means of the pointing apparatus, generating a button press event by means of an application program of a user terminal interworking with the touch screen; transmitting the button press event to the external pointing apparatus, and colliding a mass of a linear vibrator against a bottom side according to a digital signal corresponding to the button press event; when the external pointing apparatus is separated from the button, generating a button press release event by means of the application program of the user terminal interworking with the touch screen; and transmitting the button press release event to the external pointing apparatus, and colliding the mass of the linear vibrator against an top side according to a digital signal corresponding to the button press release event. gate layer.

BRIEF DESCRIPTION OF THE DRAWINGS

The above and other aspects, features and other advantages of the present invention will be more clearly understood from the following detailed description taken in conjunction with the accompanying drawings, in which:

FIGS. 12A and 12B are conceptual diagrams illustrating an operation of moving the position of an object on the touch screen by means of the haptic stylus according to the present invention.

FIGS. 14A and 14B are conceptual diagrams illustrating the haptic feedback for an operation of increasing/reducing a window on the touch screen by means of the haptic stylus according to the present invention.

FIG. 18 is a conceptual diagram illustrating a principle of generating a vibration according to a change in the number of selected characters in a document when the haptic stylus according to the present invention is used to drag and select a plurality of the characters on the touch screen.

DETAILED DESCRIPTION OF THE PREFERRED EMBODIMENT

Figure 1:
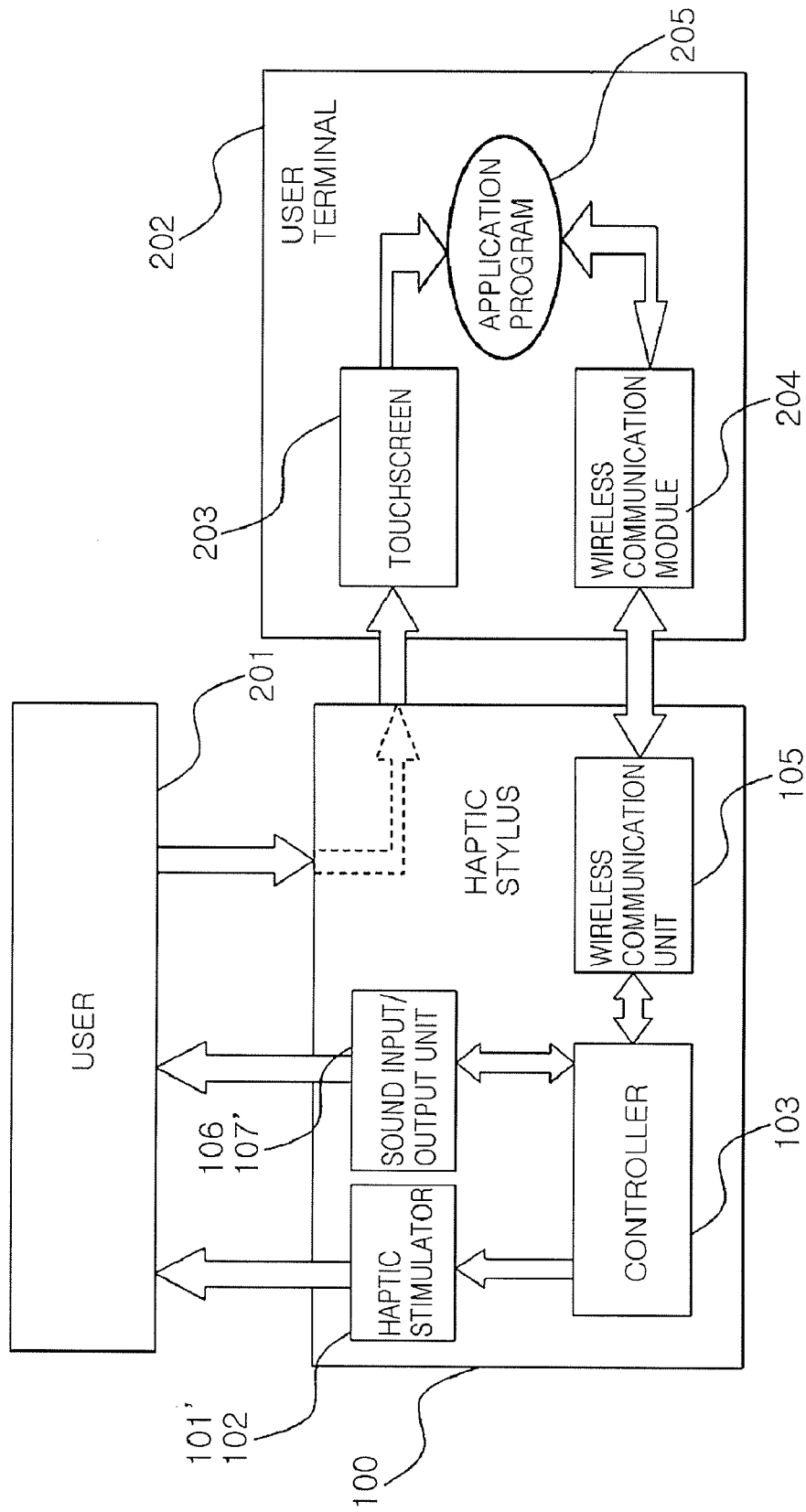
FIG. 1 is a block diagram of a haptic interaction system using a haptic stylus according to an embodiment of the present invention.

Exemplary embodiments of the present invention will now be described in detail with reference to the accompanying drawings. Like reference numerals refer to like elements throughout. In some embodiments, well-known processes, device structures, and technologies will not be described in detail to avoid ambiguousness of the present invention.

It will be understood that when an element is referred to as being "connected to" other element, it may be directly connected to the other element, or may be electrically connected to the other element with intervening elements interposed therebetween. Also, it will be understood that the terms "include" and "comprise," as well as derivatives thereof, when used in this specification, specify the presence of stated elements, but do not preclude the presence or addition of one or more other elements unless otherwise specified.

The present invention is applied to any case of controlling a pointer on a screen by handling a stylus. Also, the stylus is not necessarily pen-type but may be any type of device that can control a pointer in a screen through planar movement, while contacting a screen from the outside or approaching to the surface of the screen.

FIG. 1 is a block diagram of a haptic interaction system using a haptic stylus according to an embodiment of the present invention.

As illustrated in FIG. 1, when a user 201 uses a haptic stylus 100 to contact a user terminal 202 including a touch screen 203, an application program 205, which is under execution in the user terminal 202, generates haptic output information corresponding to the contact.

The generated haptic output information is transmitted through a wireless communication module 204 to a wireless communication unit 105 of the haptic stylus 100.

The wireless communication unit 105 transfers the received haptic output information to a controller 103, and the controller 103 generates a control signal for reproducing a haptic pattern corresponding to the haptic output information.

Thereafter, the controller 103 reproduces a suitable haptic pattern by using the control signal to control haptic stimulators 101 and 102 in the haptic stylus 100 held by the user 201.

Herein, the haptic output information is information about a haptic pattern reproduced in the haptic stimulators 101 and 102, and the haptic pattern is a pattern that is reproduced, for example, in the cycle of a vibration or the intensity of a vibration. The control signal means a digital signal.

For example, if the user 201 presses a button on the touch screen 203 while holding the haptic stylus 100, suitable haptic output information is transmitted through the wireless communication module 204 to the haptic stylus 100 according to a button-related event generated by the application program 205 of the user terminal 202.

The haptic stylus 100 reproduces a haptic pattern corresponding to the received haptic output information so that the user 201 gets a haptic feeling as if he actually presses a button.

Also, the haptic stylus 100 includes a sound output unit such as a speaker 106 so that a related sound effect, i.e., a sound can be reproduced during the reproduction of a haptic pattern.

That is, the application program 205 transfers suitable sound information related to the haptic output to the haptic stylus 100, and the haptic stylus 100 reproduces a suitable sound through the speaker 106 during the reproduction of a haptic pattern.

Also, the haptic stylus 100 may include sound input/output units such as the speaker 106 and a microphone 107 so that the user 201 can make a voice call or give a voice command while using the user terminal 202 including the touch screen 203.

Figure 2:
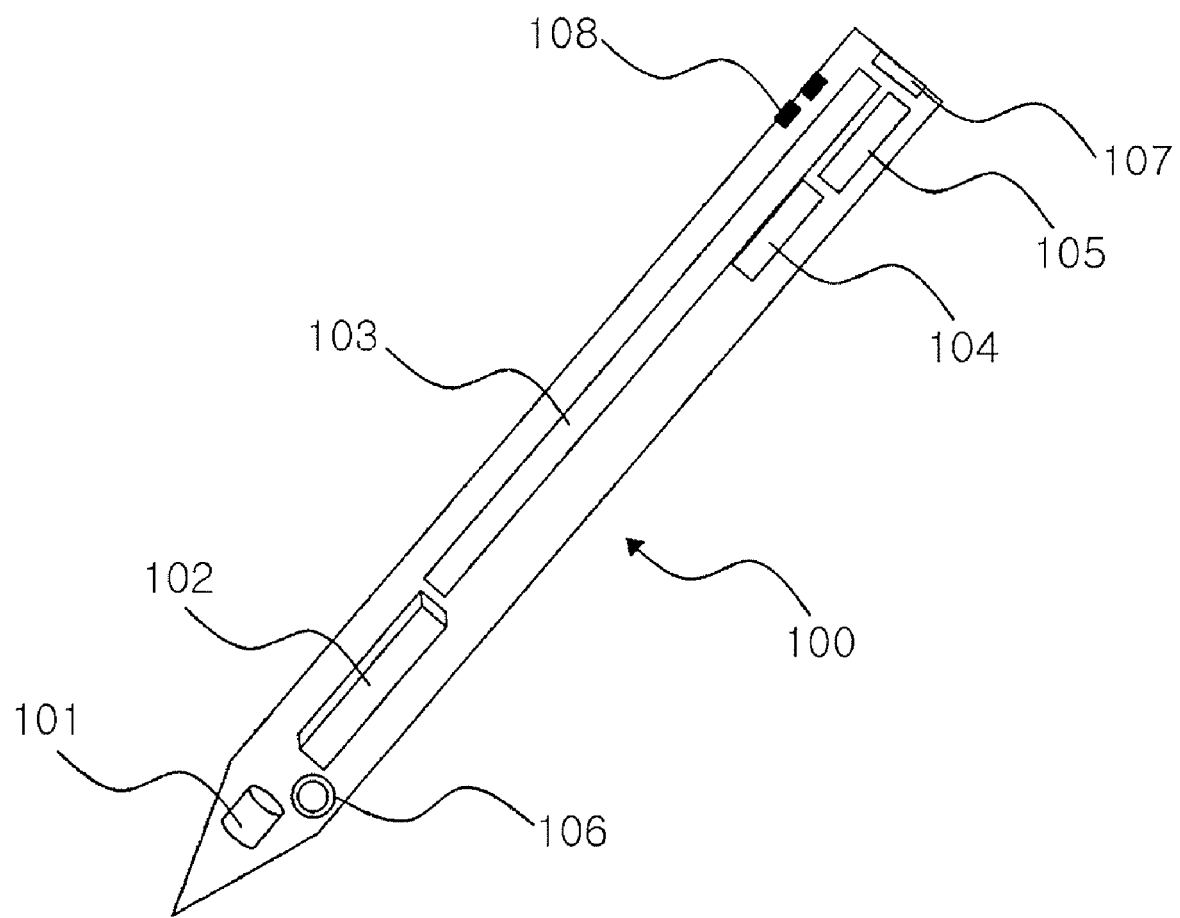
FIG. 2 is a perspective view of a haptic stylus according to an embodiment of the present invention shown in FIG. 1.

FIG. 2 is a perspective view of a haptic stylus 100 according to an embodiment of the present invention shown in FIG. 1.

As illustrated in FIG. 2, the haptic stylus 100 is a pen-type pointing device that is used for a touch screen to generate haptic feedback.

The haptic stylus 100 includes a rotary vibrator 101 for generating a vibration by rotation of a mass; a linear vibrator 102 for generating an impact and a vibration by linear movement of a mass; a controller 103 for controlling the respective elements included in the haptic stylus 100; a battery 104 serving as an internal power supply unit 104; and a wireless communication unit 105 for wireless communication with the outside.

Also, the haptic stylus 100 may further include a charge terminal 108 for charging; and a microphone 107 and a speaker 106 for sound input/output functions.

Figure 3A:
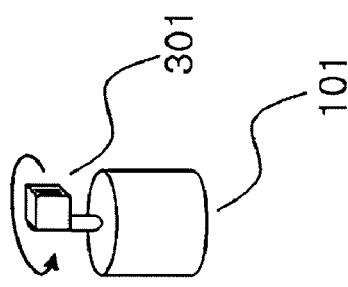
FIGS. 3A and 3B are conceptual diagrams illustrating an operation of a rotary vibrator of the haptic stylus according to the present invention.
Figure 3B:
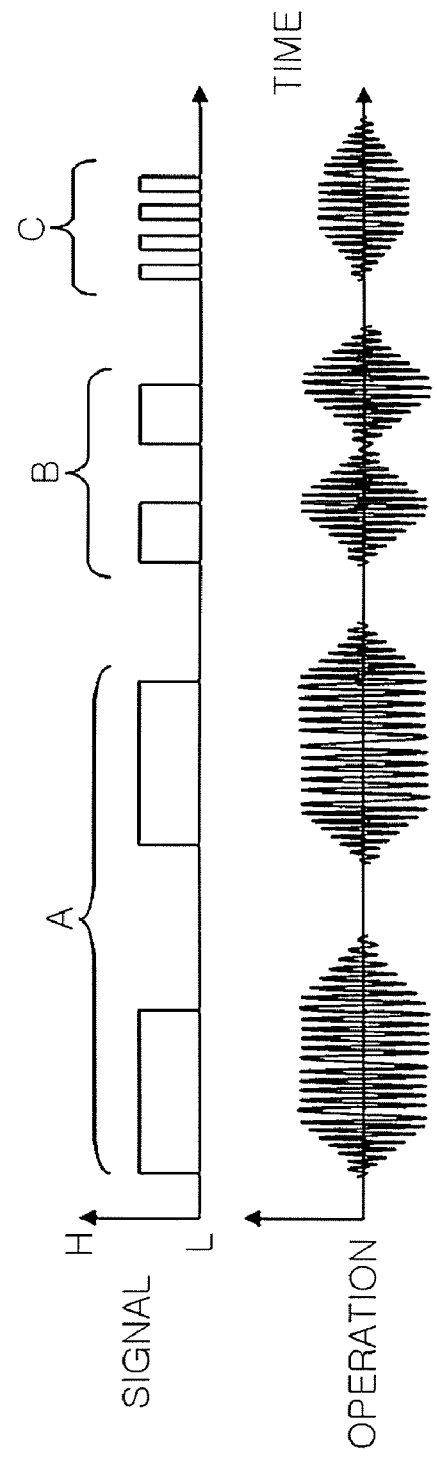

FIGS. 3A and 3B are conceptual diagrams illustrating an operation of the rotary vibrator 101 shown in FIG. 2.

As illustrated in FIG. 3A, the rotary vibrator 101 generates a vibration by the eccentric rotation of a mass 301 that is eccentrically attached to a rotation axis.

As illustrated in FIG. 3B, due to inertia of the mass 301, the rotary vibrator 101 takes some time to reach the maximum intensity of the vibration when the power is supplied (HIGH), and rotates for some time without stopping the rotation immediately when the power supply is interrupted (A).

If the power is supplied for a short time and the supply frequency is increased, the vibration fails to reach the maximum intensity due to the short power supply time. However, in this case, since the power is resupplied before the stop of the rotation of the mass 301, the intensity of the vibration is weak whereas the vibration can be generated continuously (B, C).

Since a vibration is one of the haptic stimuli that can be most sensitively felt by persons, a vibrator can be well used for a haptic feedback device. However, a rotary vibrator fails to stop rotation accurately at a desired time.

Figure 4A:
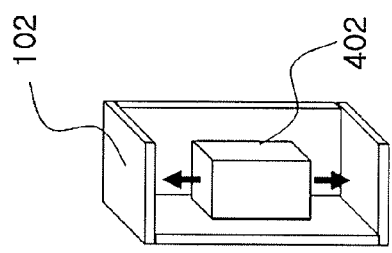
FIGS. 4A and 4B are conceptual diagrams illustrating an operation of a linear vibrator of the haptic stylus according to the present invention.
Figure 4B:
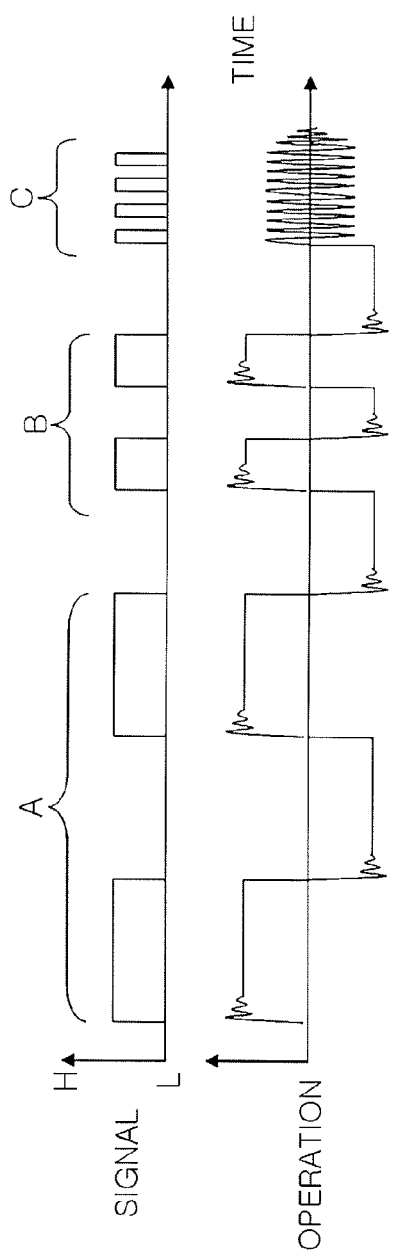

FIGS. 4A and 4B are conceptual diagrams illustrating an operation of the linear vibrator 102 shown in FIG. 2.

As illustrated in FIG. 4A, the linear vibrator 102 generates a vibration by linearly moving a mass 402 by means of a magnetic field.

As illustrated in FIG. 4B, if digital signals HIGH and LOW are used to control the linear vibrator 102 as the case of A, the mass 402 moves to one side when the digital signal HIGH is applied thereto, and moves to the opposite side when the digital signal LOW is applied thereto.

Since the digital signal changes suddenly, the mass 402 collides with one side to generate an impact. Since the linear vibrator 102 is less affected by inertia, it has a relatively small interference between the current signal and the previous signal even when the signal cycle is reduced as the case of B. If the signal cycle is further reduced as the case of C, the mass 402 vibrates without colliding with the wall side.

Figure 5A:
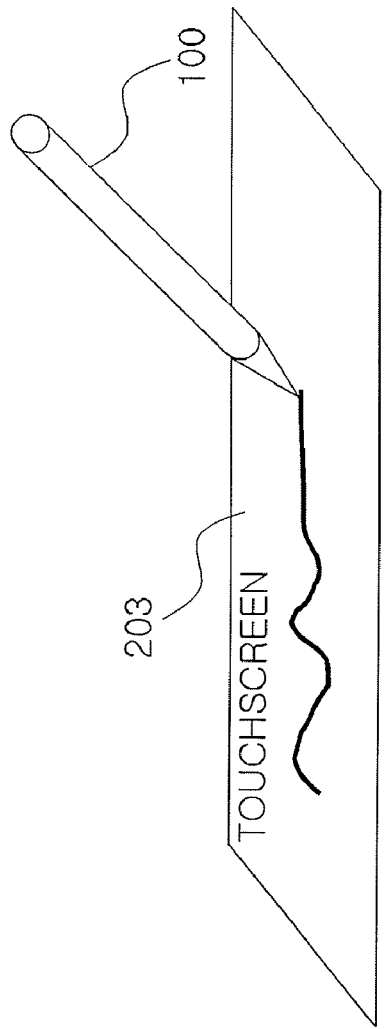
FIGS. 5A and 5B are conceptual diagrams illustrating a principle of changing the cycle of a vibration while the haptic stylus according to the present invention is used to draw or write on a touch screen.
Figure 5B:
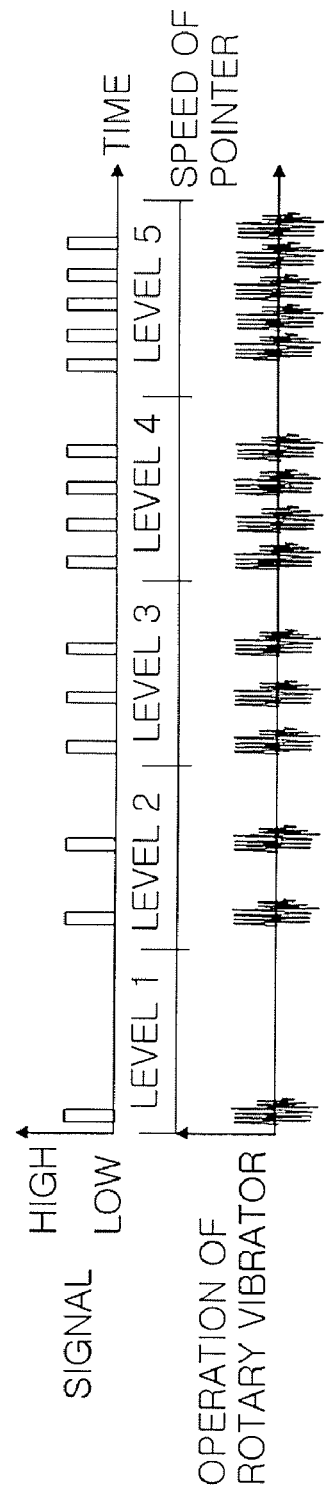

FIGS. 5A and 5B are conceptual diagrams illustrating a principle of changing the cycle of the vibration while the haptic stylus 100 according to an embodiment of the present invention is used to draw or write on the touch screen 203.

As illustrated in FIG. 5A, in order to reproduce a haptic feeling while drawing or writing on the touch screen 203 by means of the haptic stylus 100, the cycle of the digital signal is increased within the cycle range of not rotating the rotary vibrator 101 continuously (i.e., the cycle range of not generating a condition like the case C of FIG. 3B) as the speed of rubbing the surface of the touch screen 203 is increased.

When the surface of the touch screen 203 is rubbed by means of the haptic stylus 100, a pointer moves with the movement of the haptic stylus 100. At this point, the cycle of an input signal of the rotary vibrator 101 is increased as the speed of the pointer is increased.

For example, as illustrated in FIG. 5B, the vibration is generated once per a second when the speed of the pointer is at a level 1, and the vibration is generated five times per a second when the speed of the pointer is at a level 5. That is, as the moving speed of the haptic stylus 100 is increased, a stimulus is generated more frequently, so that a haptic feeling is generated as if a stroke is made rapidly in writing or drawing. Herein, the cycle of the stimulus may be determined to be within a predetermined level, or may be determined to be in a continuous functional relationship with the moving speed of the haptic stylus 100.

Figure 6:
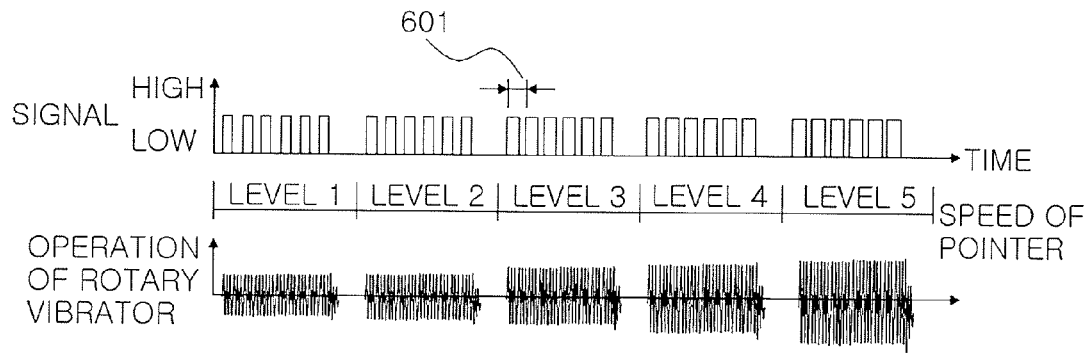
FIG. 6 is a conceptual diagram illustrating a principle of changing the intensity of a vibration while the haptic stylus according to the present invention is used to draw or write on the touch screen.

FIG. 6 is a conceptual diagram illustrating a principle of changing the intensity of the vibration while the haptic stylus 100 according to an embodiment of the present invention is used to draw or write on the touch screen 203.

In order to generate a realistic feeling of making a stroke on the surface of the touch screen 203 while drawing or writing on the touch screen 203 by means of the haptic stylus 100, the vibration intensity of the rotary vibrator 101 is increased as the rubbing speed is increased.

As illustrated in FIG. 6, if the vibration intensity of the rotary vibrator 101 is changed depending on the speed of making a stroke on the surface of the touch screen 203, a control signal is supplied at a period to vibrate the rotary vibrator 101 continuously (i.e., within the cycle range of generating a condition like the case C of FIG. 3B). At this point, a time corresponding to a signal HIGH is controlled in one cycle 601.

For example, in the case of a speed level 1, HIGH:LOW is 1:1, and in the case of a speed level 5, the signal cycle is the same as in the speed level 1 but the ratio of HIGH is much higher than the ratio of LOW. This scheme of controlling the ratio of HIGH:LOW in a high frequency signal is called pulse width modulation (PWM). Herein, the ratio of the signal HIGH in the entire cycle is called a duty ratio.

As illustrated in FIG. 6, as the duty ratio increases, the digital signal seems to be supplied like an analog signal, so that the vibration can be generated at a higher intensity.

Thus, the speed of the pointer moving with the movement of the haptic stylus 100 may be determined to be within a predetermined level, or may be determined to be in a continuous functional relationship with the HIGH duration time of the stimulus within a single cycle.

Figure 7:
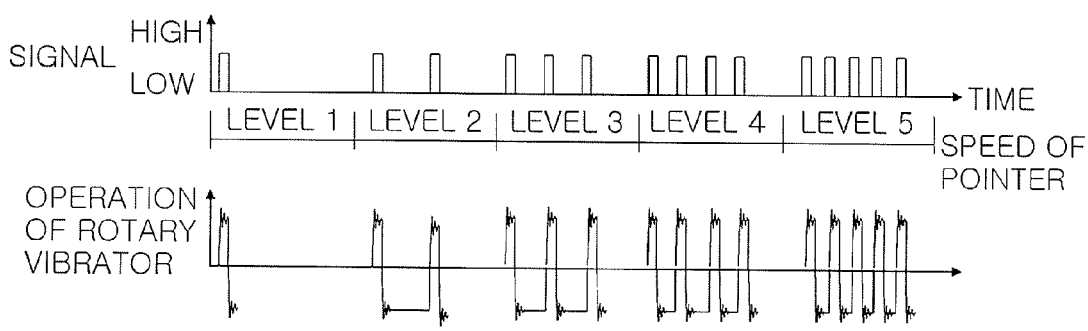
FIG. 7 is a conceptual diagram illustrating a principle of changing the cycle of a vibration by means of a linear vibrator while the haptic stylus according to the present invention is used to draw or write on the touch screen.

FIG. 7 is a conceptual diagram illustrating a principle of changing the intensity of the vibration by means of the linear vibrator 102 while the haptic stylus 100 according to an embodiment of the present invention is used to draw or write on the touch screen 203.

As a method of feeding back a realistic feeling of making a stroke on the surface of the touch screen 203 while drawing or writing on the touch screen 203 by means of the haptic stylus 100, a method of increasing the stimulus cycle of the rotary vibrator 101 with an increase in the rubbing speed has been illustrated in FIGS. 5A and 5B. This principle may be implemented not only by the rotary vibrator 101, but also by the linear vibrator 102.

As illustrated in FIG. 7, within the signal frequency range of causing the up-and-down collision of the linear vibrator 102 (i.e., the frequency range of not generating a condition like the case C of FIG. 4B), when the surface of the touch screen 203 is rubbed by means of the haptic stylus 100, the pointer moves with the movement of the haptic stylus 100. Herein, the cycle of an input signal of the linear vibrator 102 increases as the speed of the pointer increases. For example, if the speed of the pointer is at a level 1, the vibration may be generated once per a second; and if the speed of the pointer is at a level 5, the vibration may be generated five times per a second.

At this point, at the time when the signal changes from HIGH to LOW, the mass 402 in the linear vibrator 102 collides with the top side and the bottom side alternately by one time, a feeling of rubbing a granular surface is reproduced for the user 201 holding the haptic stylus 100.

In particular, the linear vibrator 102 is apparent in terms of the start and end of the signal, so that the user 201 feels as if a granular pattern of a surface is rubbed at a higher speed as the surface is rubbed at a higher speed.

As described in FIG. 7, the speed of the pointer moving with the movement of the haptic stylus 100 may be determined to be within a predetermined level, or may be determined to be in a continuous functional relationship with the cycle of a stimulus.

Figure 8:
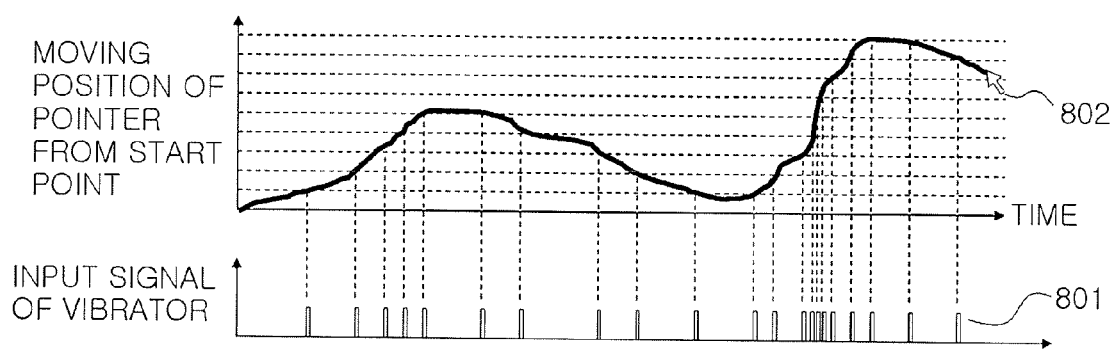
FIG. 8 is a conceptual diagram illustrating a principle of generating a vibration according to a change in the position of a pointer while the haptic stylus according to the present invention is used to draw or write on the touch screen.

FIG. 8 is a conceptual diagram illustrating a principle of generating a vibration according to a change in the position of the pointer while the haptic stylus 100 according to an embodiment of the present invention is used to draw or write on the touch screen 203.

As the simplest method, the cycle of the vibration stimulus proportional to the moving speed of a pointer 802 may be determined using the moving position of the pointer 802. That is, as illustrated in FIG. 8, an input signal 801 for generating the vibration of the rotary vibrator 101 or the collision of the linear vibrator 102 is input every time when a change occurs by a predetermined position amount of the pointer 802.

The input signal 801 is used as a signal of a vibration generating device such a rotary vibrator and a linear vibrator. A change in the position increases as the speed of the movement increases. Therefore, it is possible to reproduce a haptic stimulus proportional to the movement speed.

At this point, an operating system of the user terminal 202, i.e., the application program 205 generates an event every time when the movement is generated. The user terminal 202 can generate the vibration of the rotary vibrator 101 or the collision of the linear vibrator 102 every time when the movement event of the pointer 802 is generated while the haptic stylus 100 is used to draw or write on the touch screen 203.

Figure 9A:
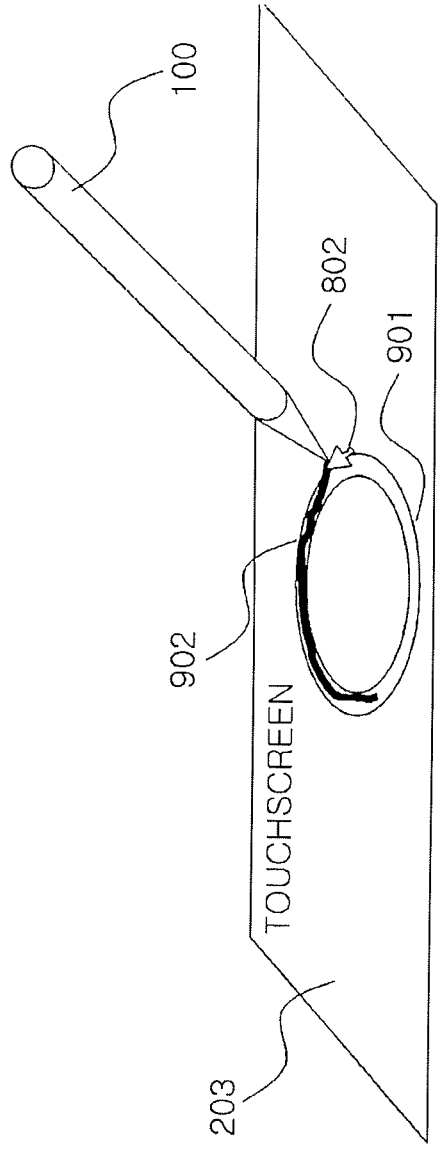
FIGS. 9A and 9B are conceptual diagrams illustrating a method of using haptic feedback to inform a condition of the pointer deviating from a predetermined region while the haptic stylus according to the present invention is used to draw or write on the touch screen.
Figure 9B:
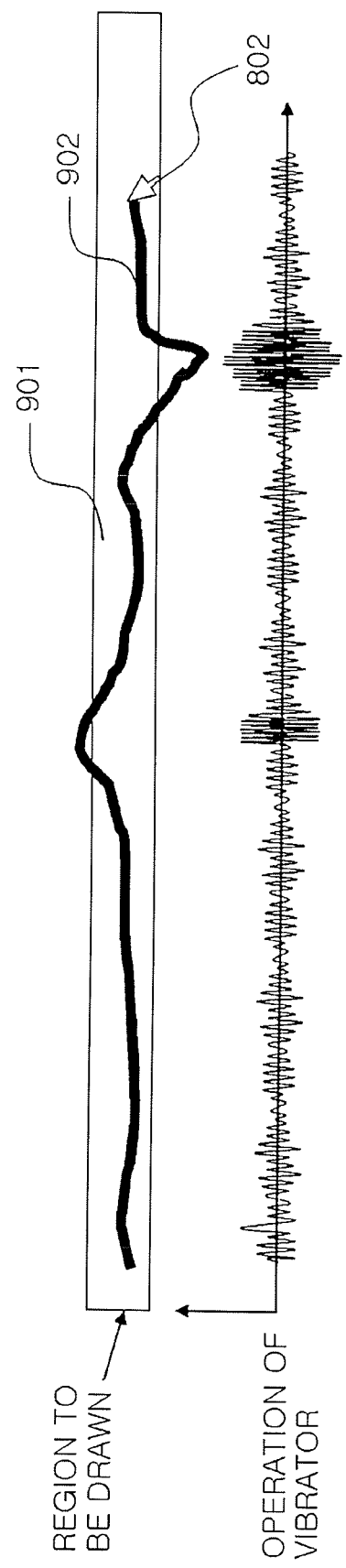

FIGS. 9A and 9B are conceptual diagrams illustrating a method of using haptic feedback to inform a condition of the pointer deviating from a predetermined region while the haptic stylus 100 according to an embodiment of the present invention is used to draw or write on the touch screen 203.

As illustrated in FIG. 9A, if the spatial range of a work region 901, a picture or a character to be drawn or written during the contact with the touch screen 203 is predetermined, the strong vibration stimulus of the vibrators 101 and 102 may be used to inform the deviation from the region 901 from the time when a moving position 902 of the pointer 802 deviates from the region 901.

At this point, the vibrators 101 and 102 may be replaced by a variety of vibrators that can generate a strong output. Also, the vibration intensity may increase as the deviation distance increases.

In particular, if a picture is drawn according to the principle of FIGS. 9A and 9B, when the pointer 802 is moved to draw the picture in the predetermined region, the haptic stimulation method proportional to the movement speed may be used as illustrated in FIGS. 5, 6, 7 and 8.

Figure 10A:
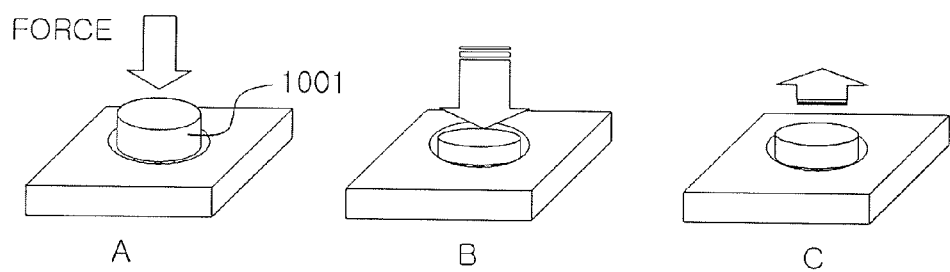
FIGS. 10A and 10B are conceptual diagrams illustrating an operation of pressing a general button.
Figure 10B:
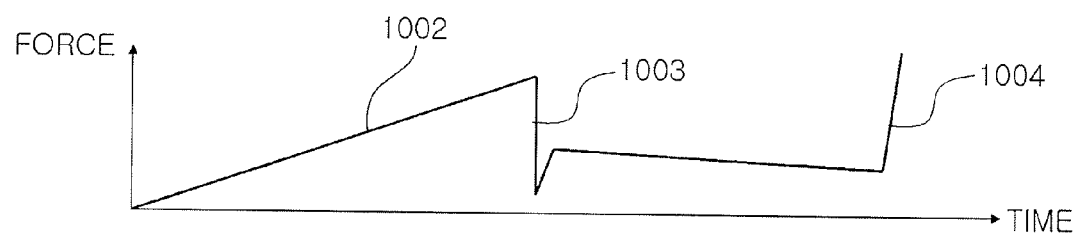

FIGS. 10A and 10B are conceptual diagrams illustrating an operation of pressing a button.

As illustrated in FIG. 10A, an operation of pressing a button 1001 may be divided into a point of starting to press the button 1001 as represented by A, a point of the press displacement becoming the maximum as represented by B, and a point of removing the hand from the button 1001 as represented by C.

The user 201 must continuously apply a stronger force when proceeding from the state A to the state B in order to press the button 1001 (1002). At the time when the strength of the force exceeds a predetermined level, the button 1001 enters downward with a sudden displacement change. At this time, the user 201 feels a sudden force reduction at the point B (1003). The user 201 presses the button 1001 at a predetermined strength or more after the button 1001 is pressed to the limit, and the user 201 feels a force pushing up the hand while removing the hand from the button 1001. Consequently, a sudden downward impact of B in pressing the button 1001 and a sudden upward impact of C in removing the hand from the button 1001 become the important components of the haptic feeling.

Figure 11A:
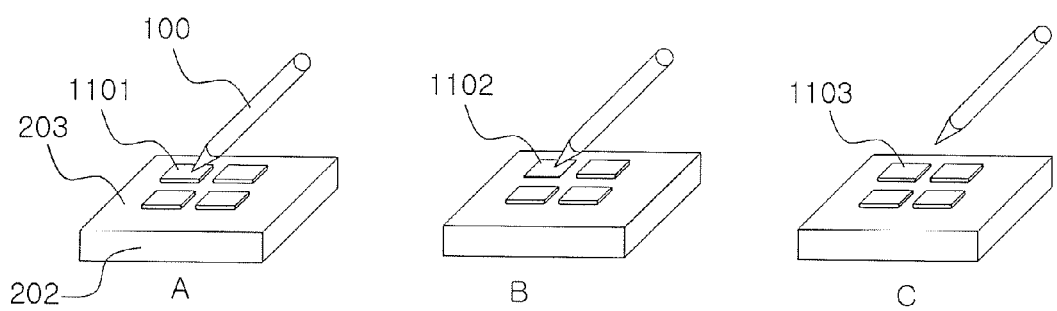
FIGS. 11A and 11B are conceptual diagrams illustrating an operation of pressing a button on the touch screen by means of the haptic stylus according to the present invention.
Figure 11B:
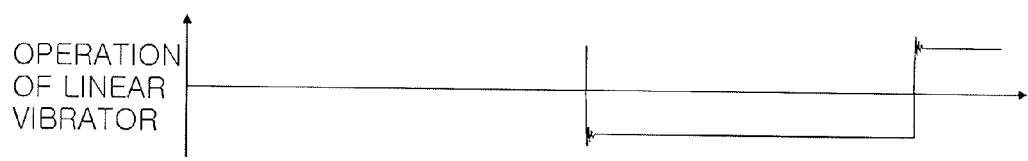

FIGS. 11A and 11B are conceptual diagrams illustrating an operation of pressing a button on the touch screen 203 by means of the haptic stylus 100 according to an embodiment of the present invention.

As illustrated in FIG. 11A, the haptic stylus 100 includes the linear vibrator 102 whose longitudinal direction is in parallel to the moving axis of the mass 402. That is, the linear vibrator 102 is included so that the impacts of the top and bottom sides can be generated for the user 201 holding the haptic stylus 100. In the present invention, the mass 402 is initialized spaced apart from the bottom side, in order to implement the feeling of a button.

As illustrated in FIG. 11A, an operation of pressing a button 1101 on the touch screen 203 may be divided into a point of starting to press the button 1101 as represented by A, a point of the press displacement becoming the maximum as represented by B, and a point of removing the hand from the button 1101 as represented by C.

As illustrated in FIGS. 10 and 11, the user 201 must continuously apply a stronger force when proceeding from the state A to the state B in order to press the button 1101. This portion is naturally generated on the touch screen 203. At the time when the strength of the force exceeds a predetermined level, the button 1101 enters downward with a sudden displacement change as represented by B (1102).

At this time, an impact felt by the user 201 with a sudden force reduction at the point B may be reproduced by colliding the mass 402 of the linear vibrator 102 in the haptic stylus 100 downward.

The user 201 presses the button 1101 at a predetermined strength or more after the button 1101 is pressed to the limit. The condition C of a force 1004 pushing up the hand while removing the hand from the button 1101 may be reproduced by colliding the mass 402 of the linear vibrator 102 in the haptic stylus 100 upward.

FIGS. 12A and 12B are conceptual diagrams illustrating an operation of moving the position of an object on the touch screen 203 by means of the haptic stylus 100 according to an embodiment of the present invention.

As illustrated in FIG. 12A, objects whose positions can be controlled by the control of the pointer 1102, such as an opened window 1204 and an icon 1201 symbolizing files, short keys, and folders are present on a screen of the user terminal 202, and haptic feedback may be given during the movement of the objects after selection.

When moving an object on the touch screen 203, most users feel a difficulty in determining whether the object is selected, and it is very difficult to control the position while finely feeling a change in the position of the object. However, the use of the haptic feedback makes it possible to intuitively inform the user whether the object is selected and whether the object is being moved.

As illustrated in FIG. 12A, at the time when the icon 1201 is selected, the mass 402 of the linear vibrator 102 in the haptic stylus 100 is collided upward in order to reproduce a feeling as if the icon 1201 adheres to the pointer 1202. A haptic feedback signal is output during the movement 1203 of the selected icon by using one of the methods illustrated in FIGS. 5, 6, 7 and 8 for the haptic stimulation method proportional to the moving speed of the pointer 1202. At this time, one of the linear vibrator 102 and the rotary vibrator 101 may be used as a vibrator for outputting a haptic stimulus.

Thereafter, at the time when the haptic stylus 100 is separated from the touch screen 203 after the movement of the icon 1201 to a desired position, the mass 402 of the linear vibrator 102 in the haptic stylus 100 is collided downward in order to reproduce a feeling as if the icon 1201 is separated. The same principle may be used to reproduce a feeling when the window 1204 is selected and removed.

Also, if the mass 402 needs to be moved upward after completion of the operation, the mass 402 is gradually moved upward (1207) so that the user 201 does not feel any haptic impact.

Figure 13:
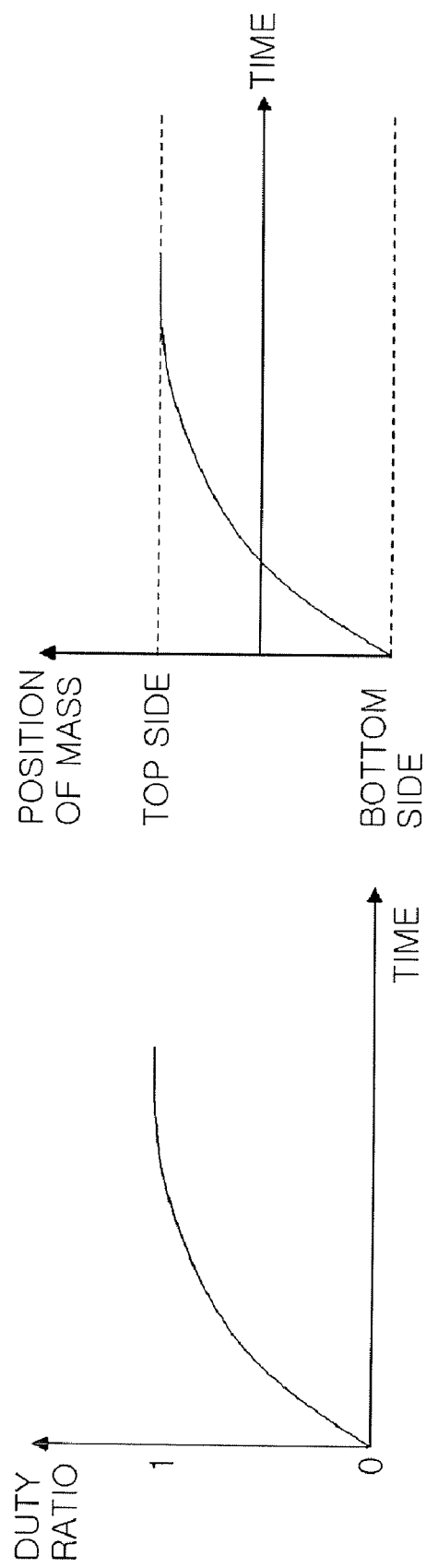
FIG. 13 is a graph illustrating a method of moving a mass of the linear vibrator according to the present invention without an impact on the contact surface.

FIG. 13 is a graph illustrating a method of moving the mass 402 of the linear vibrator 102 without an impact on any side according to an embodiment of the present invention.

The initial position of the mass 402 of the linear vibrator 102 is very important in terms of haptic feedback. For example, if a downward impact is to be applied, it is impossible to generate a downward impact when the mass 402 is already moved to the bottom. Therefore, it is occasionally necessary to move the mass 402 upward or downward without an impact. What is thus required is a method of gradually moving the mass 402 of the linear vibrator 102 to a desired position without an impact.

That is, the PWM scheme described in FIG. 6 may be used for the gradual movement of the mass 402. In order to gradually move the mass 402 of the linear vibrator 102 without an impact, the mass 402 is gradually moved upward while gradually increasing the duty ratio from 0.

As illustrated in FIG. 13, if the duty ratio is increased with time, the mass 402 is gradually moved to the end without an impact. If the mass 402 is first located at the bottom, it is moved upward. Using the opposite algorithm, the mass 402 is moved downward without an impact even if the mass 402 is located at the top.

FIGS. 14A and 14B are conceptual diagrams illustrating the haptic feedback for an operation of increasing/reducing a window on the touch screen 203 by means of the haptic stylus 100 according to an embodiment of the present invention.

As illustrated in FIG. 14A, when the haptic stylus 100 is used to dispose the pointer 1202 at the edge, apex or outer boundary of the window 1204, it becomes a mode for selection of a change in the window size. At this point, the mass 402 of the linear vibrator 102 in the haptic stylus 100 is collided to the bottom side and then to the top side in order to reproduce a feeling as if the window 1204 adheres to the haptic stylus 100. At this time, the gradual movement may be applied within a short time in order to remove the downward impact.

A haptic stimulus is outputted during the change of the selected window by using one of the methods illustrated in FIGS. 5, 6, 7 and 8 for the haptic stimulation method proportional to the moving speed of the pointer 1202. At this time, one of the linear vibrator 102 and the rotary vibrator 101 may be used as a vibrator for outputting the haptic stimulus.

Thereafter, at the time when the haptic stylus 100 is separated from the touch screen 203 after the change of the window size to a desired level, the mass 402 of the linear vibrator 102 in the haptic stylus 100 is collided downward in order to reproduce a feeling as if the window is separated.

Thereafter, the mass 402 is gradually moved upward after completion of the operation, so that the user 201 does not feel any haptic impact.

Figure 15A:
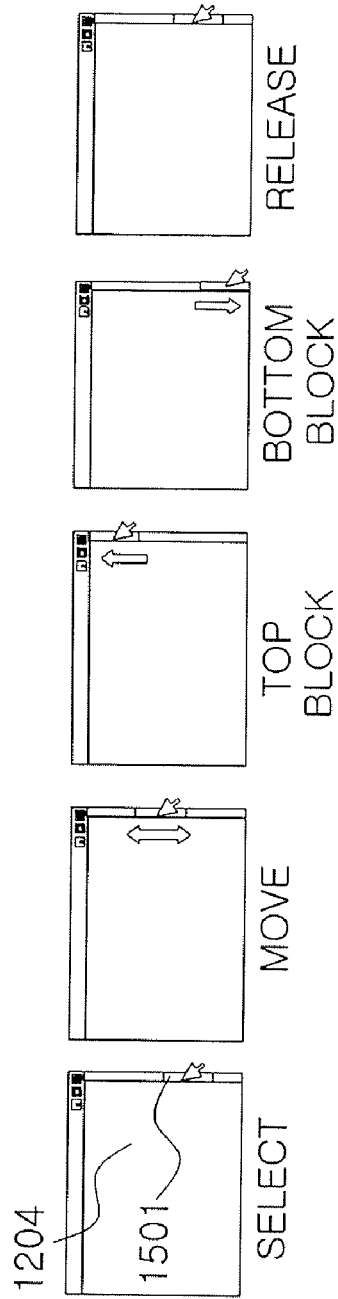
FIGS. 15A and 15B are conceptual diagrams illustrating an operation of controlling a scroll bar of a window on the touch screen by means of the haptic stylus according to the present invention.
Figure 15B:
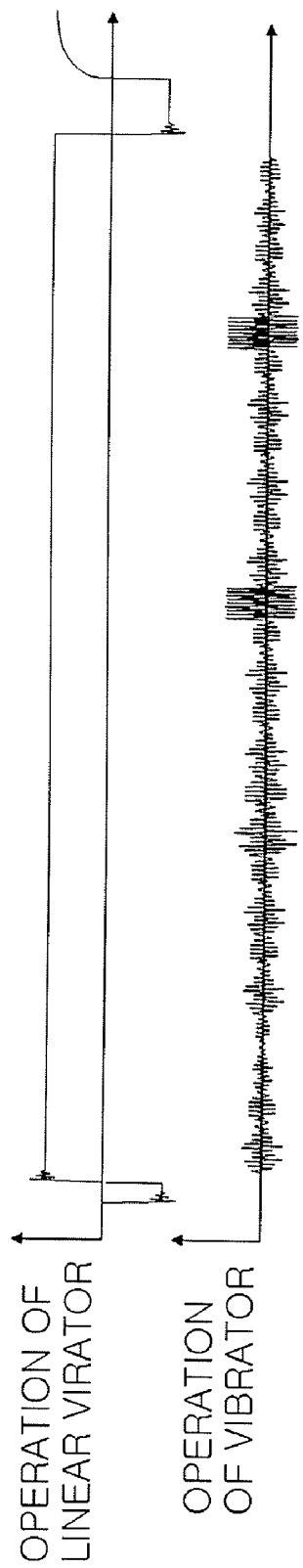

FIGS. 15A and 15B are conceptual diagrams illustrating an operation of controlling a scroll bar of a window on the touch screen 203 by means of the haptic stylus 100 according to an embodiment of the present invention.

As illustrated in FIG. 15A, when the haptic stylus 100 is used to dispose the pointer 1202 on a scroll bar 1501 of the window 1204, the movement of the scroll bar 1501 is selected. At this point, the mass 402 of the linear vibrator 102 in the haptic stylus 100 is collided to the bottom side and then to the top side in order to reproduce a feeling of adhering to the pointer. At this time, the gradual movement may be applied within a short time in order to remove the downward impact.

A haptic feedback is outputted during the movement of the selected scroll bar 1501 by using one of the methods illustrated in FIGS. 5, 6, 7 and 8 for the haptic stimulation method proportional to the moving speed of the pointer 1202. At this time, one of the linear vibrator 102 and the rotary vibrator 101 may be used as a vibrator for outputting the haptic stimulus.

Thereafter, when the scroll bar 1501 reaches the top or bottom limit, the vibrator is used to generate a short and strong vibration, thereby making it possible for the user to haptically detect that the scroll bar 1501 has reaches the block. At the time when the haptic stylus 100 is separated from the touch screen 203 after the movement of the scroll bar 1501 to a desired position, the mass 402 of the linear vibrator 102 in the haptic stylus 100 is collided downward in order to reproduce a feeling as if the scroll bar 1501 is separated. Thereafter, the mass 402 is gradually moved upward after completion of the operation, so that the user 201 does not feel any haptic impact.

Figure 16A:
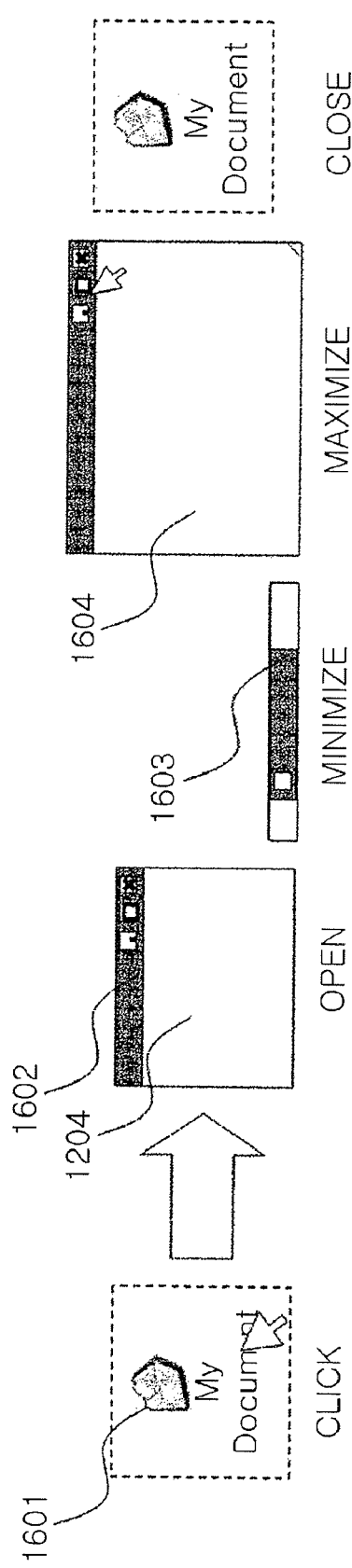
FIGS. 16A and 16B are conceptual diagrams illustrating an operation of controlling a window size control button on the touch screen by means of the haptic stylus according to the present invention.
Figure 16B:
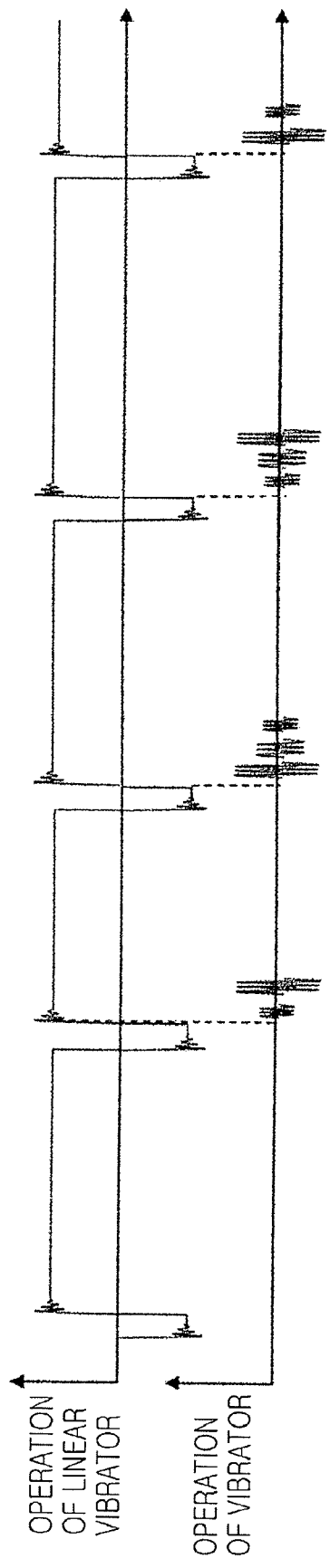

FIGS. 16A and 16B are conceptual diagrams illustrating an operation of controlling a window size control button on the touch screen 203 by means of the haptic stylus 100 according to an embodiment of the present invention.

As illustrated in FIGS. 16A and 16B, when the haptic stylus 100 is used to select and execute a specific icon 1501, the mass 402 of the linear vibrator 102 is collided downward or upward according to the action of the user 201 in order to reproduce a feeling of clicking the icon.

That is, in order to reproduce a feeling of the window 1204 being opened in a pop-up manner, the mass 402 of the linear vibrator 102 in the haptic stylus 100 is collided upward and then downward, and the rotary vibrator 101 or the linear vibrator 102 is used to provide a short and weak vibration and a short and strong vibration sequentially.

Also, when a minimization (or maximization) button located in a title bar 1602 of the window 1204 is pressed, the mass 402 of the linear vibrator 102 is collided downward and then upward according to the action of the user 201 in order to reproduce a feeling of pressing the button, and then the vibration intensity of the vibrator is reduced (or increased) step by step in order to transfer a feeling of the minimization (or maximization) of the window.

Also, when a close button located in the title bar 1602 of the window 1204 is pressed, the mass 402 of the linear vibrator 102 is collided downward and then upward according to the action of the user 201 in order to reproduce a feeling of pressing the button, and then the rotary vibrator 101 or the linear vibrator 102 is used to provide a short and strong vibration and a short and weak vibration sequentially. The sequential step may be increased or reduced suitably, or the intensity may be reduced continuously, instead of the sequential step.

Figure 17A:
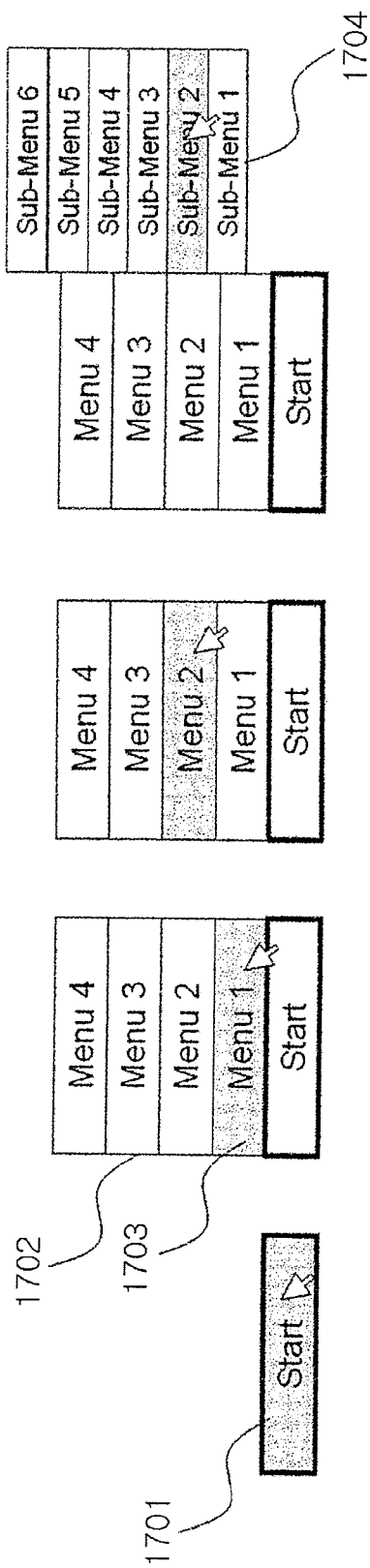
FIGS. 17A and 17B are conceptual diagrams illustrating an operation of controlling a menu movement and a pop-up menu on the touch screen by means of the haptic stylus according to the present invention.
Figure 17B:
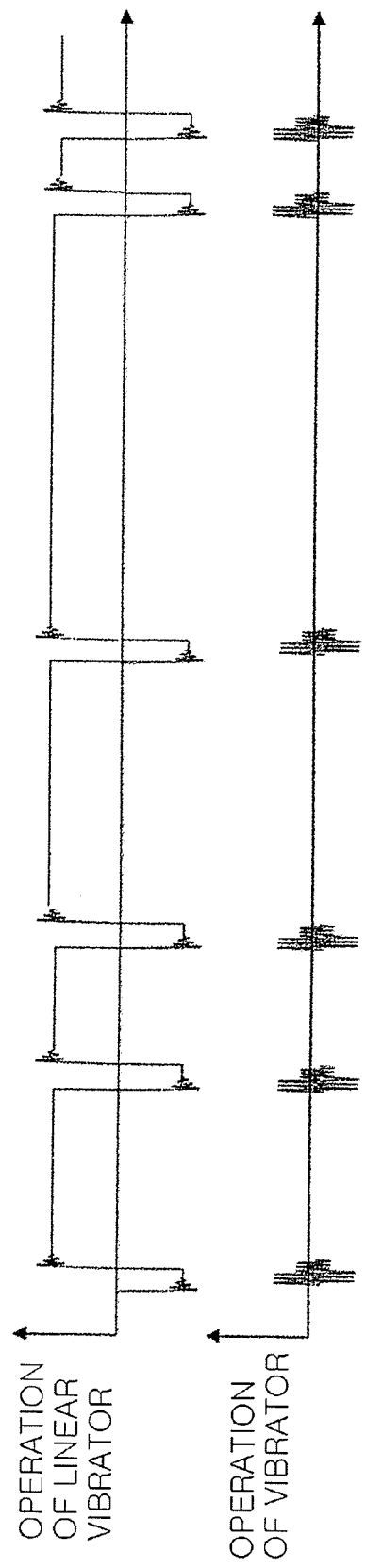

FIGS. 17A and 17B are conceptual diagrams illustrating an operation of controlling a menu movement and a pop-up menu on the touch screen 203 by means of the haptic stylus 100 according to an embodiment of the present invention.

As illustrated in FIG. 17A, when the haptic stylus 100 is used to move the pointer to a menu or a menu list, a haptic feedback is used to inform whether the menu is changed or at which menu the pointer is located.

Specifically, if only the linear vibrator 102 is used, the mass 402 is sequentially collided upward and downward for a short time, thus informing that the specific menu has been selected. Also, the linear vibrator 102 is used for a vibration mode with a small impact, or the rotary vibrator 101 is operated momentarily at the change of the menu, thereby making it possible for the user 201 to feel the menu change intuitively and haptically.

A haptic feedback is generated in all of the case of selecting a start menu 1701 initially, the case of executing a pop-up menu 1702 that is a new menu list, the case of moving to a new menu 1703 within the new pop-up menu 1702, the case of moving to the menu of the same level, and the case of executing a new pop-up menu 1704 in the selected menu.

At this point, the user 201 can accurately detect the movement of the selected menu through the haptic feedback.

FIG. 18 is a conceptual diagram illustrating a principle of generating a vibration according to a change in the number of selected characters in a document when the haptic stylus according to the present invention is used to drag and select a plurality of the characters on the touch screen.

As shown in FIG. 18, a user may make the haptic stylus 100 be in contact with a document 1801 on the touch screen 203 of the user terminal 202, and then move to select some contents 1802. At this point, the haptic feedback may be provided according to a change in the number of the selected characters by colliding a second mass 402 of the linear vibrator 102 in an opposite side according to the change in the number of the selected characters.

The haptic feedback may be applied in the same manner according to the change in the number of the above-mentioned selected items when at least selectable one from an icon, a folder, a file and the like is selected on the touch screen 203.

Figure 19:
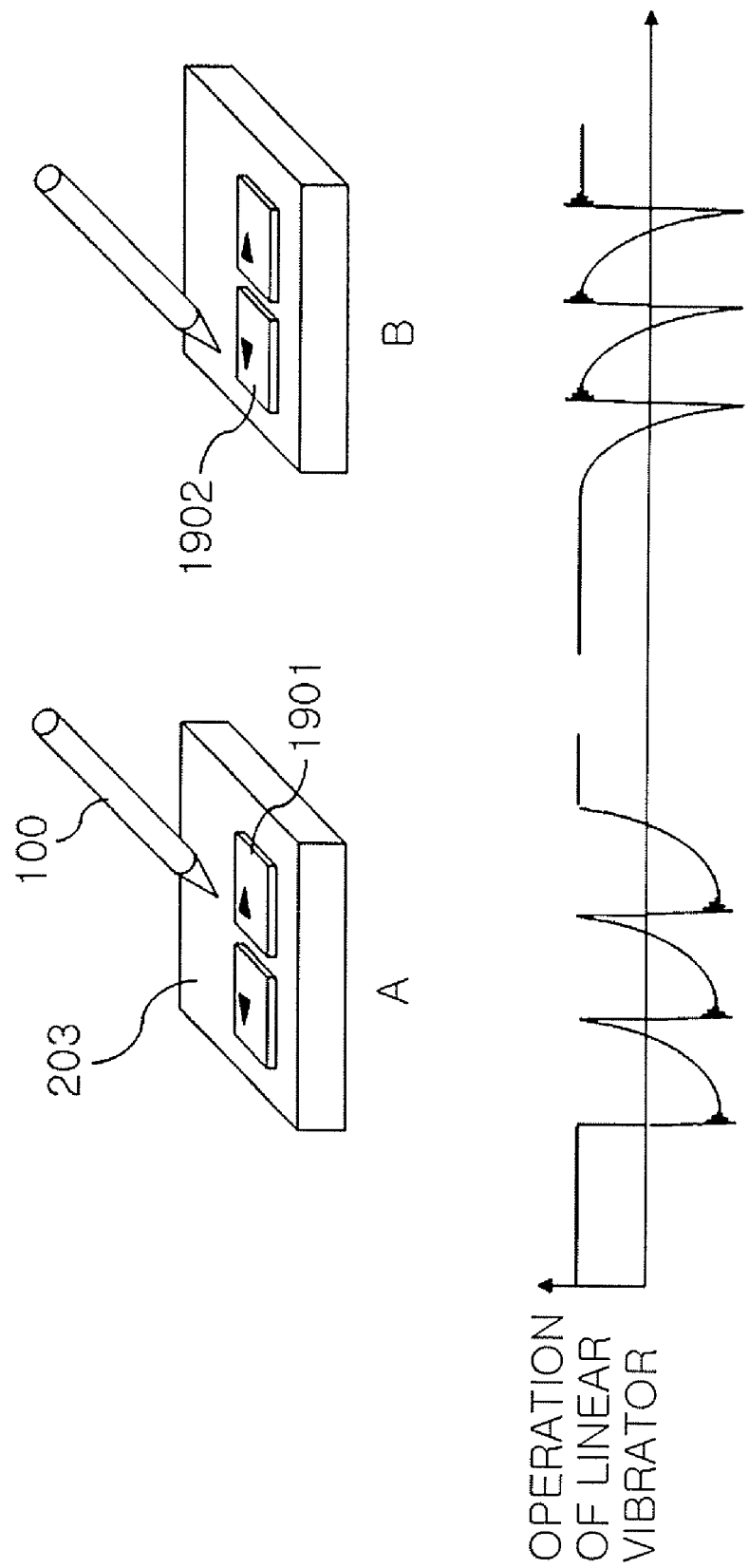
FIG. 19 is a conceptual diagram illustrating a method of inducing a user's input by providing a haptic feedback according to the intention of the button when the haptic stylus according to the present invention is used to dispose a cursor on a certain button on the touch screen.

FIG. 19 is a conceptual diagram illustrating a method of inducing a user's input by providing a haptic feedback according to the intention of the button when the haptic stylus according to the present invention is used to dispose a cursor on a certain button on the touch screen.

More particularly, it is described, for example, that, on the touch screen 203, there are a bottom 1901 having an intention to make progress of an operation and a bottom 1902 having an intention to run against an operation, as shown in FIG. 19.

When the user uses the haptic stylus 100 to perform an operation on the touch screen 203, if the user moves the haptic stylus 100 onto the bottom 1901 having an intention to make progress of an operation in order to perform the next operation (A), the application program 205 induces the user to press the button 1901 by repeatedly colliding the mass 402 of the linear vibrator 102 downward in order to facilitate the user's operation progress.

At this point, when the mass 402 of the linear vibrator 102 is collided downward and then moves upward again, the mass 402 gradually move upward so that the user cannot feel an upward impact. In this case, the user feels only a downward impact, that is, an impact in a direction of pressing down the button 1901, thus to induce the clicking of the button 1901.

On the contrary, if the user moves the haptic stylus 100 onto the button 1902 having an intention to run against an operation in order to return to the previous operation (B), the application program 205 induces the user to avoid clicking of the button 1902 by repeatedly colliding the mass 402 of the linear vibrator 102 upward in order to facilitate warnings and the avoidance of errors against the operation progress.

Similarly in this case, when the mass 402 of the linear vibrator 102 is collided upward and then moves downward again, the mass 402 gradually move downward so that the user cannot feel an downward impact.

Figure 20:
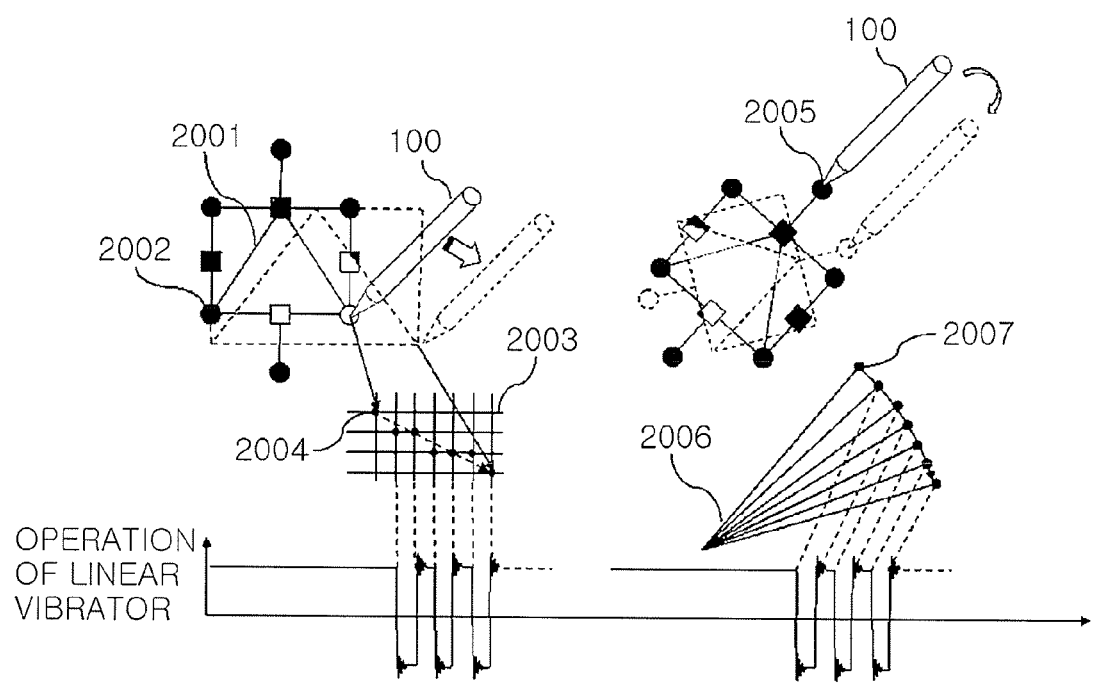
FIG. 20 is a conceptual diagram illustrating a method of providing a haptic feedback according to a change in the size or angle of a figure when the haptic stylus according to the present invention is used to edit the figure on the touch screen.

FIG. 20 is a conceptual diagram illustrating a method of providing a haptic feedback according to a change in the size or angle of a figure when the haptic stylus according to the present invention is used to edit the figure on the touch screen.

As shown in FIG. 20, when a user uses the haptic stylus 100 to edit the size or angle of a FIG. 2001, control handles 2002 and 2005 of the selected FIG. 2001 are selected and moved to change its size and angle.

More particularly, when a user uses the haptic stylus 100 to hold and move the control handle 2002 in order to edit the size of the figure, a position 2004 of the control handle, which is selected on unit coordinates 2003 on which an actual size of the figure is determined, is changed. At this point, the haptic feedback may be provided according to the change in the unit position of the control handle by colliding a second mass 402 of the linear vibrator 102 in an opposite direction, which helps the user to accurately change the size of the figure.

Similarly, when a user holds and moves the control handle 2005 in order to edit the angle of the figure by using the haptic stylus 100, an angle 2007 of the control handle is changed with respect to the rotation center. At this point, the haptic feedback may be provided according to the change in the angle of the control handle as much as a unit angle 2006 by colliding a second mass 402 of the linear vibrator 102 in an opposite direction, which helps the user to accurately rotate the figure.

Figure 21:
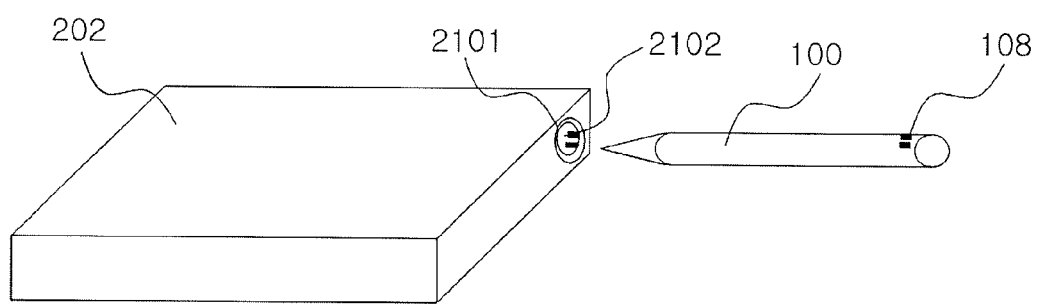
FIG. 21 is a conceptual diagram illustrating a method of charging the haptic stylus according to the present invention.

FIG. 21 is a conceptual diagram illustrating a method of charging the haptic stylus 100 according to an embodiment of the present invention.

As illustrated in FIG. 21, the user terminal 202 includes a hole-type or groove-type charge unit 2101 and a charge terminal 2102, which may correspond to the charge terminal 108 of the haptic stylus 100.

The charge terminal 2102 of the user terminal 202 is a terminal contact unit that has a charge power supply circuit using the internal power source of the user terminal 202. While the haptic stylus 100 is being inserted in the hole-type or groove-type charge unit 2101, an internal charge battery 104 of the haptic stylus 100 is charged.

Figure 22:
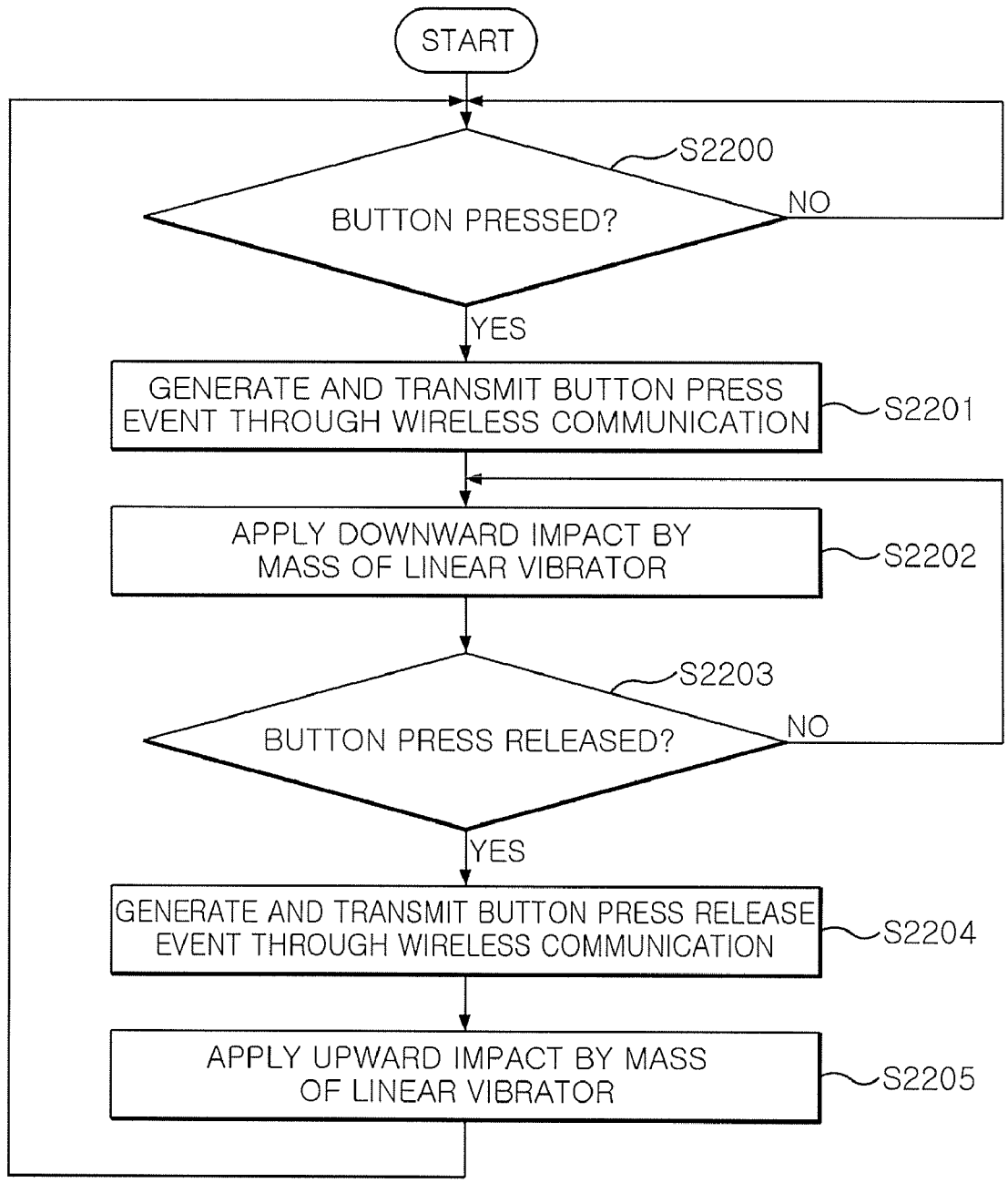
FIG. 22 is a flow chart illustrating a haptic interaction operation while a button on the touch screen is pressed by means of the haptic stylus according to the present invention.

FIG. 22 is a flow chart illustrating a haptic interaction operation while a button on the touch screen is pressed by means of the haptic stylus according to an embodiment the present invention.

As illustrated in FIG. 22, when the user 201 presses a button on the touch screen 203 of the user terminal 202 by means of the haptic stylus 100 (S200), a button press event is generated by the application program 205 of the user terminal 202 interworking with the touch screen 203, and the button press event is transferred through the wireless communication module 204 to the wireless communication unit 105 of the haptic stylus 100 (S2201).

Upon receiving the button press event, the mass 402 of the linear vibrator 102 applies a downward impact (S2202) to reproduce a feeling of pressing the button.

Thereafter, when the haptic stylus 100 is separated from the button on the touch screen 203 (S2203), a button press release event is generated by the application program 205 of the user terminal 202 interworking with the touch screen 203, and the button press release event is transferred through the wireless communication module 204 to the wireless communication unit 105 of the haptic stylus 100 (S2204).

Upon receiving the button press release event, the mass 402 of the linear vibrator 102 applies an upward impact (S2205) to reproduce a feeling of the return of the button.

As described above, the present invention uses the haptic feedback of the haptic stylus to reduce the control ambiguity generated when using a touch screen, thereby enabling the accurate control of the touch screen and thus increasing the usability.

Also, the present invention gives a haptic feedback function to a haptic stylus, thereby making it possible to provide the haptic feedback function without modifying a touch screen. Therefore, it is possible to solve the problem of intervening in a touch screen manufacturing process in order to directly install a haptic feedback device in the touch screen.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pointing apparatus capable of providing haptic feedback, the pointing apparatus comprising:
   a wireless communication unit receiving an event including haptic output information through wireless communication with the outside;
   a controller generating a control signal for reproducing a haptic pattern corresponding to the haptic output information; and
   a haptic stimulator reproducing the haptic pattern by means of the control signal,
   wherein the haptic stimulator comprises at least one of:
   a rotary vibrator generating a vibration by means of a first mass that is rotated by the control signal; and
   a linear vibrator generating an impact and a vibration by means of a second mass that linearly moves upward and downward by a magnetic field corresponding to the control signal,
   wherein the controller increases an input cycle of the control signal in proportion to the moving speed of a pointer.

2. The pointing apparatus of claim 1, further comprising:
   a battery serving as a power supply unit; and
   a charge terminal charging the battery.

3. The pointing apparatus of claim 1, further comprising:
   a sound output unit reproducing a sound effect corresponding to the haptic pattern.

4. The pointing apparatus of claim 3, wherein the controller controls the sound output unit to output an alarm or alarm sound.

5. The pointing apparatus of claim 1, further comprising:
   a microphone and a speaker providing a sound input/output function for a voice call or a voice command.

6. The pointing apparatus of claim 1, wherein the event is generated in response to an operation of the pointing apparatus on a touch screen.

7. The pointing apparatus of claim 1, wherein the first mass is eccentrically attached to a rotation axis of the rotary vibrator to generate the vibration through eccentric rotational motion.

8. The pointing apparatus of claim 1, wherein when a target on a touch screen is selected or released, the controller generates one of an impact of the second mass on the top side, a sequential impact of the second mass on the top side and the bottom side, and a sequential impact of the second mass on the bottom side and the top side.

9. The pointing apparatus of claim 1, wherein when a target on a touch screen is selected or released, the controller generates a vibration of the first mass or the second mass.

10. The pointing apparatus of claim 1, wherein the controller increases the vibration intensity of the rotary vibrator in proportion to the moving speed of a pointer.

11. The pointing apparatus of claim 1, wherein when a pointer moves by a unit of a movement distance, the controller generates a short vibration of the rotary vibrator or a sequential impact of the linear vibrator on the bottom side and the top side.

12. The pointing apparatus of claim 1, wherein the controller gradually increases the intensity of a vibration while the size of a window is maximized.

13. The pointing apparatus of claim 1, wherein the controller gradually reduces the intensity of a vibration while the size of a window is minimized.

14. The pointing apparatus of claim 1, wherein the controller increases the intensity of a vibration in proportion to the deviation distance of a pointer from a predetermined region.

15. The pointing apparatus of claim 1, wherein when a window on a touch screen is closed, the controller generates one of a gradually weakening vibration, a short vibration, and a sequential impact of the linear vibrator on the bottom side and the top side for a predetermined time.

16. The pointing apparatus of claim 1, wherein when a new pop-up menu is generated on a touch screen, the controller generates one of a short vibration, and a sequential impact of the linear vibrator on the bottom side and the top side for a predetermined time.

17. The pointing apparatus of claim 1, wherein when the number of objects selected by the pointing apparatus is varied on a touch screen, the controller generates a sequential impact of the second mass on the top side and the bottom side.

18. The pointing apparatus of claim 17, wherein the objects selected by the pointing apparatus on the touch screen is selected from the group consisting of a character in a document, an icon, a folder and a file which is selectable one or more.

19. The pointing apparatus of claim 1, wherein when the pointing apparatus is disposed on a button having a predetermined purpose, the controller generates a repetitive impact of the second mass on the top side or the bottom side.

20. The pointing apparatus of claim 19, wherein the controller collides the second mass against only one of the top side and the bottom side, and gradually moves the second mass so that it cannot collide with the opposite side when it moves to the opposite side.

21. The pointing apparatus of claim 1, wherein when the size or angle of a figure are varied on a touch screen as much as a reference unit value by the pointing apparatus, the controller generates a sequential impact of the second mass on the top side and the bottom side.

22. The pointing apparatus of claim 1, wherein when the speed of the pointer moving with a movement of the pointer apparatus is determined to be within a predetermined level, the controller adjusts the input cycle of the control signal corresponding to the predetermined level.

23. A haptic interaction system using a pointing apparatus capable of providing haptic feedback, the haptic interaction system comprising:
   a pointing apparatus controlling a pointer of a touch screen by contacting the touch screen or approaching the surface of the touch screen from the outside of the touch screen, receiving an event including haptic output information corresponding to the control of the pointer through wireless communication, and reproducing a haptic pattern corresponding to the haptic output information; and
   a user terminal generating in an application program the event including the haptic output information corresponding to the control of the pointer in the touch screen, and transmitting the generated event to the pointing apparatus,
   wherein the pointing apparatus comprises a controller for generating a control signal for reproducing a haptic pattern corresponding to the haptic output information, and
   wherein the controller increases or decreases an input cycle of the control signal in proportion to the moving speed of a pointer increasing or decreasing, respectively.

24. The haptic interaction system of claim 23, wherein the pointing apparatus further comprises:

a wireless communication unit receiving an event including the haptic output information through wireless communication with the user terminal; and a haptic stimulator reproducing the haptic pattern by means of the control signal, the haptic simulator comprising at least one of:

a linear vibrator generating a motion of a mass in a vertical direction with respect to the contact surface of the touch screen; and a rotary vibrator comprising a rotatable eccentric mass.

25. The haptic interaction system of claim 24, wherein the pointing apparatus further comprises:

a microphone and a speaker that provides a sound input/output function for a voice call or a voice command to control the user terminal.

26. The haptic interaction system of claim 23, wherein the pointing apparatus is pen-type.

27. The haptic interaction system of claim 23, wherein the pointing apparatus is charged through the user terminal.

* * * * *